(12) United States Patent
Dudney (10) Patent No.: US 7,661,223 B2
(45) Date of Patent: Feb. 16, 2010

(54) PORTABLE SECURITY DEVICE FOR FISHING RODS AND REELS

(76) Inventor: Morris Dudney, 5400 Preston Oaks Rd., Apt. 3020, Dallas, TX (US) 75240

( * ) Notice: Subject to any disclaimer, the term of this patent is extended or adjusted under 35 U.S.C. 154(b) by 265 days.

(21) Appl. No.: 11/830,060

(22) Filed: Jul. 30, 2007

(65) Prior Publication Data

US 2009/0031610 A1  Feb. 5, 2009

(51) Int. Cl.
  *A01K 97/18* (2006.01)
  *E05B 73/00* (2006.01)
  *B65D 33/01* (2006.01)
  *B65D 33/16* (2006.01)

(52) U.S. Cl. .................. 43/26; 206/315.11; 224/922; 70/65; 70/64; 70/18; 383/74; 383/72; 383/113; 383/119; 383/121; 383/100; 383/103

(58) Field of Classification Search .............. 43/26; 70/57–59, 61, 64, 65, 18, 63; 206/315.11, 206/315, 315.2, 315.3; 224/922; 383/71, 383/72, 74, 75, 109, 113, 117, 119, 121, 383/121.1, 100, 103

See application file for complete search history.

(56) References Cited

U.S. PATENT DOCUMENTS

| | | | | |
|---|---|---|---|---|
| 110,340 | A | * | 12/1870 | Carter .................. 383/103 |
| 314,985 | A | * | 3/1885 | Young .................. 70/65 |
| 403,928 | A | * | 5/1889 | Emeric .................. 383/72 |
| 436,287 | A | * | 9/1890 | Marshall .................. 383/103 |
| 651,256 | A | * | 6/1900 | May .................. 383/71 |
| 656,398 | A | * | 8/1900 | Fairfax .................. 383/71 |
| 672,499 | A | * | 4/1901 | Tully .................. 383/117 |

(Continued)

FOREIGN PATENT DOCUMENTS

DE  3103783 A1 * 9/1982

(Continued)

OTHER PUBLICATIONS

CorporateTravelSafety.com, PacSafe LidSafe Secure Motorcycle Helmet Gear Bag, Jul. 5, 2007.

(Continued)

*Primary Examiner*—Darren W Ark
(74) *Attorney, Agent, or Firm*—Booth Albanesi Schroeder LLC (57) ABSTRACT

A device is provided for securing against crime-of-opportunity theft at least one fishing rod and reel to be stored or transported in an outdoor, unsecured area or on an open, unsecured portion of a vehicle, such as an open bed of a pick-up truck, trailer, or boat. The device includes: (a) a flexible webbing material, wherein the flexible webbing material has a generally bag-like shape with an open end; (b) a first cable and first lock operatively connected for closing and locking the open end of the flexible webbing material around a forward portion of a fishing rod protruding through the open end when at least the rear portion thereof is positioned inside the flexible webbing material, and (c) a second cable and second lock operatively connected for attaching and locking the flexible webbing material to a fixed structure in the open area or on the vehicle; wherein each of the flexible webbing material, the first cable for closing, and the second cable for attaching is resistant to cutting with a hand-held knife.

21 Claims, 6 Drawing Sheets

U.S. PATENT DOCUMENTS

| | | | | |
|---|---|---|---|---|
| 679,422 | A * | 7/1901 | Heritage | 43/26 |
| 764,398 | A * | 7/1904 | Upton | 43/26 |
| 849,040 | A * | 4/1907 | Benser et al. | 70/65 |
| 866,965 | A * | 9/1907 | Redding | 70/65 |
| 909,726 | A * | 1/1909 | Williams | 383/103 |
| 1,001,996 | A * | 8/1911 | Scott | 70/65 |
| 1,010,901 | A * | 12/1911 | Hamm | 383/119 |
| 1,015,908 | A * | 1/1912 | Sackett | 70/64 |
| 1,020,395 | A * | 3/1912 | Beck | 70/65 |
| 1,055,002 | A * | 3/1913 | Varnum | 70/65 |
| 1,148,924 | A * | 8/1915 | Paradise | 383/71 |
| 1,418,717 | A * | 6/1922 | Josephson | 383/121.1 |
| 1,700,734 | A * | 2/1929 | Brandt | 206/315.3 |
| 1,814,378 | A * | 7/1931 | Gilbertson et al. | 383/117 |
| 1,903,798 | A * | 4/1933 | Turner | 43/26 |
| 1,915,196 | A * | 6/1933 | McGuire | 383/117 |
| 1,980,104 | A * | 11/1934 | Silverspitz | 43/26 |
| 1,982,813 | A * | 12/1934 | Jacobi | 70/65 |
| 2,022,251 | A * | 11/1935 | Mallay et al. | 383/71 |
| 2,040,559 | A * | 5/1936 | Luttrell | 383/103 |
| 2,105,853 | A * | 1/1938 | Brodie | 206/315.6 |
| 2,136,598 | A * | 11/1938 | Strayer | 70/65 |
| 2,166,860 | A * | 7/1939 | Davis | 70/65 |
| 2,253,688 | A * | 8/1941 | Collins | 383/117 |
| 2,323,318 | A * | 7/1943 | Farkas | 383/117 |
| 2,416,747 | A * | 3/1947 | Geimer | 383/117 |
| 2,447,940 | A * | 8/1948 | Holland | 383/113 |
| 2,510,186 | A * | 6/1950 | Marsico et al. | 383/72 |
| 2,552,443 | A * | 5/1951 | Molinari | 383/117 |
| 2,603,028 | A * | 7/1952 | Roberts | 383/103 |
| 2,618,880 | A * | 11/1952 | Sourek | 43/26 |
| 2,682,290 | A * | 6/1954 | Ditlea | 383/117 |
| 2,713,370 | A * | 7/1955 | Quinn | 383/117 |
| 2,723,482 | A * | 11/1955 | Marten | 43/26 |
| 2,739,409 | A * | 3/1956 | Sokolik | 383/103 |
| 2,823,971 | A * | 2/1958 | Hoyt | 43/26 |
| 2,854,775 | A * | 10/1958 | Kleckley | 43/26 |
| 2,867,257 | A * | 1/1959 | Cart | 206/315.3 |
| 2,869,277 | A * | 1/1959 | Breithaupt | 43/26 |
| 2,897,863 | A * | 8/1959 | Somers, Jr. | 383/103 |
| 2,907,506 | A * | 10/1959 | Sammons | 224/922 |
| 2,913,029 | A * | 11/1959 | Paton | 383/113 |
| 2,913,030 | A * | 11/1959 | Fisher | 206/315.11 |
| 3,033,259 | A * | 5/1962 | Landis, Sr. | 206/315.11 |
| 3,176,427 | A * | 4/1965 | Hershey | 383/117 |
| 3,204,362 | A * | 9/1965 | Andrews | 43/26 |
| 3,406,930 | A * | 10/1968 | Seiler | 224/922 |
| 3,490,169 | A * | 1/1970 | Tweed | 206/315.11 |
| 3,575,327 | A * | 4/1971 | Harrison | 43/26 |
| 3,635,433 | A * | 1/1972 | Anderson | 211/70.8 |
| 3,662,933 | A * | 5/1972 | Michel | 43/26 |
| 3,674,188 | A * | 7/1972 | Anderson | 383/103 |
| 3,674,190 | A * | 7/1972 | Wright | 43/26 |
| 3,701,371 | A * | 10/1972 | Stackhouse | 383/103 |
| 3,744,687 | A * | 7/1973 | Oreck | 224/913 |
| 3,762,592 | A * | 10/1973 | Mayes | 43/26 |
| 3,811,216 | A * | 5/1974 | Sauey et al. | 43/26 |
| 3,876,076 | A * | 4/1975 | Hazelhurst | 211/70.8 |
| 3,972,144 | A * | 8/1976 | Geisler | 43/26 |
| 4,027,798 | A * | 6/1977 | Swaim | 211/70.8 |
| 4,063,646 | A * | 12/1977 | Stahl, Jr. | 224/922 |
| 4,077,151 | A * | 3/1978 | Johnson | 206/315.11 |
| 4,094,351 | A * | 6/1978 | Catenaccio | 383/103 |
| 4,134,225 | A * | 1/1979 | Welch | 383/119 |
| 4,136,478 | A * | 1/1979 | Wycosky | 43/26 |
| 4,156,446 | A * | 5/1979 | Nathan | 383/103 |
| 4,170,801 | A * | 10/1979 | Ward | 43/26 |
| 4,175,604 | A * | 11/1979 | Bonner | 70/65 |
| 4,222,193 | A * | 9/1980 | Beck | 43/26 |
| 4,251,938 | A * | 2/1981 | Goldman et al. | 43/11 |
| 4,252,324 | A * | 2/1981 | Simons | 206/579 |
| 4,306,601 | A * | 12/1981 | Wallis et al. | 43/26 |
| 4,311,262 | A * | 1/1982 | Morin | 224/922 |
| 4,359,161 | A * | 11/1982 | Sinoff | 43/26 |
| 4,369,904 | A * | 1/1983 | Christensen | 206/315.11 |
| 4,381,113 | A * | 4/1983 | Simons | 273/286 |
| 4,493,416 | A * | 1/1985 | Steinman | 43/26 |
| 4,503,559 | A * | 3/1985 | Warnke | 383/117 |
| 4,523,704 | A * | 6/1985 | Washington | 43/26 |
| 4,530,178 | A * | 7/1985 | Rauscher | 43/26 |
| 4,546,877 | A * | 10/1985 | Evans | 224/922 |
| 4,576,316 | A * | 3/1986 | Foster | 383/103 |
| 4,641,454 | A * | 2/1987 | Ray et al. | 43/26 |
| 4,643,302 | A * | 2/1987 | Baumgardner | 206/315.11 |
| 4,648,121 | A * | 3/1987 | Lowe | 383/113 |
| 4,696,122 | A * | 9/1987 | Van Der Zyl | 43/21.2 |
| 4,726,141 | A * | 2/1988 | McBride et al. | 43/26 |
| 4,775,082 | A * | 10/1988 | Krache | 224/920 |
| 4,783,978 | A * | 11/1988 | Vallerga | 70/65 |
| 4,792,073 | A * | 12/1988 | Jacober | 70/58 |
| 4,811,419 | A * | 3/1989 | Derby | 383/121 |
| 4,817,403 | A * | 4/1989 | Dimmick | 70/64 |
| 4,863,019 | A * | 9/1989 | Lewis et al. | 70/64 |
| 4,876,819 | A * | 10/1989 | Clifford | 43/26 |
| 4,916,852 | A * | 4/1990 | Zebleckis | 43/26 |
| 4,946,478 | A * | 8/1990 | Davis et al. | 383/103 |
| 4,949,842 | A * | 8/1990 | Mokiao, II | 383/103 |
| 4,974,537 | A * | 12/1990 | Martin | 224/922 |
| 5,004,100 | A * | 4/1991 | Smith | 206/315.2 |
| 5,012,964 | A * | 5/1991 | Falletta et al. | 383/103 |
| 5,050,999 | A * | 9/1991 | Van Loon, III | 383/74 |
| 5,199,572 | A * | 4/1993 | Abe | 383/72 |
| D340,576 | S * | 10/1993 | Delagarza et al. | D3/260 |
| 5,277,306 | A * | 1/1994 | Sargent | 43/26 |
| 5,293,711 | A * | 3/1994 | Robinson | 43/26 |
| 5,310,103 | A * | 5/1994 | Weber et al. | 224/922 |
| 5,327,669 | A * | 7/1994 | Lannan et al. | 43/26 |
| 5,361,611 | A * | 11/1994 | Hisler | 224/922 |
| 5,366,076 | A * | 11/1994 | Lyles | 43/26 |
| 5,417,354 | A * | 5/1995 | Jones | 43/26 |
| 5,425,194 | A * | 6/1995 | Miller | 43/26 |
| 5,435,473 | A * | 7/1995 | Larkum | 224/922 |
| 5,445,267 | A * | 8/1995 | Biafore, Jr. | 206/315.3 |
| 5,450,688 | A * | 9/1995 | Hall | 43/26 |
| 5,460,306 | A * | 10/1995 | Rudd | 224/922 |
| 5,490,594 | A * | 2/1996 | Rupe | 206/315.4 |
| 5,505,300 | A * | 4/1996 | Joh | 206/315.6 |
| 5,515,641 | A * | 5/1996 | D'Alessandro | 43/26 |
| 5,518,315 | A * | 5/1996 | Nichols | 383/119 |
| 5,560,485 | A * | 10/1996 | O'Hara, Jr. | 70/58 |
| 5,582,043 | A * | 12/1996 | McCue et al. | 70/18 |
| 5,603,573 | A * | 2/1997 | Mercier et al. | 383/117 |
| 5,625,973 | A * | 5/1997 | Anthony | 43/26 |
| 5,632,427 | A * | 5/1997 | Gattuso et al. | 224/922 |
| 5,794,747 | A * | 8/1998 | Bryant | 383/103 |
| 5,813,164 | A * | 9/1998 | Liberto | 43/21.2 |
| 5,870,023 | A * | 2/1999 | Jackson | 206/315.3 |
| 5,904,247 | A * | 5/1999 | Voelkner, Jr. | 206/315.3 |
| 5,909,833 | A * | 6/1999 | Smith | 383/67 |
| 5,941,195 | A * | 8/1999 | Martz | 383/100 |
| 6,026,662 | A * | 2/2000 | Schlipper | 70/65 |
| 6,077,587 | A * | 6/2000 | Potok | 70/65 |
| 6,085,695 | A * | 7/2000 | Miller et al. | 43/26 |
| 6,119,858 | A * | 9/2000 | Davidson | 206/315.11 |
| 6,148,998 | A * | 11/2000 | Tan | 206/315.3 |
| 6,155,001 | A * | 12/2000 | Marin | 43/26 |
| 6,186,087 | B1 * | 2/2001 | Vinas | 211/70.8 |
| 6,234,312 | B1 * | 5/2001 | Davis, Sr. | 206/315.4 |
| 6,244,081 | B1 * | 6/2001 | Schlipper | 70/65 |
| 6,263,610 | B1 | 7/2001 | Doubts, Jr. | |
| 6,269,587 | B1 * | 8/2001 | Wallace | 206/315.11 |
| 6,343,728 | B1 * | 2/2002 | Carbone | 43/26 |
| 6,447,165 | B1 * | 9/2002 | Grewe | 383/121.1 |
| 6,471,054 | B2 * | 10/2002 | Nevarez | 206/315.11 |

| | | | | |
|---|---|---|---|---|
| 6,499,248 B2 * | 12/2002 | Thompson | | 43/21.2 |
| 6,530,170 B1 * | 3/2003 | Sweeney | | 43/21.2 |
| 6,564,498 B2 * | 5/2003 | Sawtell | | 43/26 |
| 6,742,789 B1 * | 6/2004 | Nowak | | 43/54.1 |
| 6,760,994 B2 * | 7/2004 | Henault et al. | | 43/26 |
| 6,865,841 B2 * | 3/2005 | Wieringa | | 43/26 |
| 6,932,224 B1 * | 8/2005 | Sandberg | | 211/70.8 |
| 7,021,825 B1 * | 4/2006 | Schultz | | 383/76 |
| 7,069,753 B2 * | 7/2006 | Schlipper | | 70/65 |
| 7,219,464 B1 * | 5/2007 | Kujawa | | 224/922 |
| 7,322,149 B1 * | 1/2008 | Quintero | | 43/26 |
| 7,363,783 B2 * | 4/2008 | Kolton et al. | | 206/315.11 |
| 7,412,857 B2 * | 8/2008 | Kolton et al. | | 70/63 |
| 2002/0032978 A1 * | 3/2002 | Sawtell | | 43/26 |
| 2002/0134119 A1 * | 9/2002 | Derman | | 70/58 |
| 2004/0134117 A1 * | 7/2004 | Gagnon | | 43/26 |
| 2005/0126063 A1 * | 6/2005 | Bowerman | | 43/21.2 |
| 2006/0196102 A1 * | 9/2006 | Gagnon | | 43/26 |
| 2006/0207161 A1 * | 9/2006 | Lynn | | 43/26 |
| 2007/0039231 A1 * | 2/2007 | Jenkins | | 43/26 |
| 2008/0053169 A1 * | 3/2008 | Ricker et al. | | 70/64 |
| 2008/0115542 A1 * | 5/2008 | Pengelly | | 70/18 |
| 2008/0226207 A1 * | 9/2008 | Frayne | | 383/100 |
| 2009/0008007 A1 * | 1/2009 | Dube | | 70/64 |

FOREIGN PATENT DOCUMENTS

| | | | |
|---|---|---|---|
| DE | 19630916 C1 * | 12/1997 | |
| DE | 10032751 A1 * | 9/2001 | |
| FR | 2603936 A1 * | 3/1988 | |
| GB | 2224916 A * | 5/1990 | |
| GB | 2280704 A * | 2/1995 | |
| JP | 10117844 A * | 5/1998 | |
| JP | 10227162 A * | 8/1998 | |
| JP | 11075654 A * | 3/1999 | |
| JP | 11152190 A * | 6/1999 | |
| JP | 2000230355 A * | 8/2000 | |
| JP | 2004344124 A * | 12/2004 | |
| JP | 2005237339 A * | 9/2005 | |
| JP | 2006187235 A * | 7/2006 | |
| JP | 2006197844 A * | 8/2006 | |
| JP | 2008161140 A * | 7/2008 | |

OTHER PUBLICATIONS

NorthernTool.com, Northern Tool & Equipment, Peerless Cold Shut—¼in. Size, Apr. 25, 2007.

Cabela's; Master Fishing Catalog; pp. 247-248, Reel Cases and Covers; Advanced Anglers Adjustable Rod Covers; Pro Rod Bags; Rod Cases; pp. 251-255, Rod Tubes; Rod Racks; Angler's Tote; Vehicle Rod Carrier; Rod Loft Pro; Pack-A-Pole-Case; Rod Holder; Izorline Rod Sling; Frabill Pack-A-Pole Adjustable Soft Case; 2006, www.cabelas.com, Sidney Nebraska USA.

Bass Pro Shops 2006 Fishing Master Catalog; pp. 158-165, Rod Racks; Fentress Tote'em Rack; Rod Tote: Rod Ready; Lock 'N' Hold Rack; Rod Rack 'N Go; Rod Cases; Bazuka Pro; Frabill Pack-A-Pole Case; Browning Combo Caddy; Neoprene Caddy; Bass Pro Shops Reel Tote; Rod Wrap; Reel Cover; 2006, www.basspro.com, Springfield, Missouri USA.

* cited by examiner

PORTABLE SECURITY DEVICE FOR FISHING RODS AND REELS

CROSS-REFERENCE TO RELATED APPLICATIONS

Not applicable.

STATEMENT REGARDING FEDERALLY SPONSORED RESEARCH OR DEVELOPMENT

Not Applicable.

REFERENCE TO A MICROFICHE APPENDIX

Not applicable.

TECHNICAL FIELD

The present invention generally relates to devices for temporarily storing one or more fishing rods in an open area or vehicle and securing the fishing rods against crime-of-opportunity theft.

SUMMARY OF THE INVENTION

A device is provided for securing against crime-of-opportunity theft at least one fishing rod and reel to be stored or transported in an outdoor, unsecured area or on an open, unsecured portion of a vehicle, such as an open bed of a pick-up truck, trailer, or boat.

According to one aspect, the device includes: (a) a flexible webbing material, wherein the flexible webbing material has a generally bag-like shape with an open end; (b) a first cable and first lock operatively connected to the flexible webbing material for closing and locking the open end of the flexible webbing material around a forward portion of a fishing rod when at least the rear portion thereof is positioned inside the flexible webbing material, and (c) a second cable and second lock operatively connected to the flexible webbing material for attaching and locking the flexible webbing material to a fixed structure in the open area or on the vehicle; wherein each of the flexible webbing material, the first cable for closing, and the second cable for attaching is resistant to cutting with a hand-held knife.

According to another aspect of the invention, the device includes a first flexible webbing material, (i) wherein the first flexible webbing material, when opened, has a generally-tubular shape with at least one open end, and wherein the generally-tubular shape of the first flexible webbing material, when opened, has at least a sufficient internal cross-section and at least a sufficient internal length to receive at least a rear portion of a butt end of at least one fishing rod and reel, wherein the rear portion of the butt end comprises at least a handle, a reel seat, and an attached reel; (ii) wherein the first flexible webbing material is capable of retaining at least the rear portion of the butt end of at least one fishing rod and reel positioned therein from being removed in any direction substantially perpendicular to the internal length of the generally-tubular shape of the first flexible webbing material; whereby the rear portion of the butt end of at least one fishing rod and reel can be inserted or removed through the open end of the first flexible webbing material in a direction generally parallel to the internal length of the first flexible webbing material.

The device also includes a closure means for securing and locking the open end of the first flexible webbing material at least partially around a forward portion of a fishing rod protruding through the upper end when at least the rear portion thereof is positioned inside the flexible webbing material. When in such a closed position, a largest cross-section of the rear portion of the butt end of a fishing rod and reel cannot be removed through the open end of the flexible webbing material.

Further, the device includes an attaching means for securing and locking the flexible webbing material to a fixed structure in the open area or on the vehicle.

Each of the first flexible webbing material, the closure means, and the attaching means is resistant to cutting with a hand-held knife.

According to yet another aspect of the invention, a method is provided for securing against crime-of-opportunity theft of a fishing rod and reel to be stored or transported in an outdoor, unsecured area or on an open, unsecured portion of a vehicle. The method includes the steps of: (a) inserting at least a rear portion of at least one fishing rod and reel into and through an opening of a body of a device having a generally bag-like shape and formed of a flexible webbing material; (b) closing and locking the opening of the flexible webbing material around a forward portion of the fishing rod protruding through the opening when at least the rear portion thereof is positioned inside the body formed of the flexible webbing material and locking the closure for the opening to prevent removal of the rear portion of the fishing rod from inside the device; (c) attaching and locking the body of the device to any available fixed structure in the open area or on the vehicle. Each of the flexible webbing material, the closure for the opening, and the attachment to the fixed structure is resistant to cutting with a hand-held knife.

These and further aspects of the invention are described in more detail below.

BRIEF DESCRIPTION OF THE DRAWINGS

A more complete understanding of the present disclosure and advantages thereof may be acquired by referring to the following description taken in conjunction with the accompanying drawings, which.

DETAILED DESCRIPTION OF PRESENTLY-PREFERRED EMBODIMENT

The present invention is particularly focused on the problem of protecting fishing rods and attached reels from crime-of-opportunity theft. Fishing rods and reels are often quite valuable. The retail cost of a few good fishing rods and reels can run into the hundreds and even thousands of dollars.

Fishing rods and reels are peculiar, however, because they are extremely long in relation to their other dimensions. This makes fishing rods and reels rather difficult to secure against crime-of-opportunity theft. For example, they are usually much too long to store in a duffle bag or in the trunk of a vehicle. Some fishing rods are collapsible, but that can be time-consuming and make the fishing rod less accessible and convenient to use. Most vehicles and boats do not have special storage devices for fishing rods and reels.

Even if a particular fishing rod and reel can be taken apart and collapsed and later re-assembled, these can be relatively time-consuming processes, and it is often preferred to keep fishing rods with their reels maintained in an assembled condition. It is often desired to temporarily secure fishing rods and reels in areas accessible to the public or in the bed of a vehicle such as a pick-up truck, trailer, or boat. These kinds of situations can expose the fishing rods and reels to crime-of-opportunity theft.

It would be desirable to have a device and methods for temporarily storing and locking fishing rods and reels in an open area or in the bed of a vehicle against crime-of-opportunity theft. The device should be simple in design and easy to use. The device should also be relatively quick to use, for example, it should be possible to secure a plurality of fishing rods in a matter of about 10 seconds or so, and similarly, it should be possible to release the fishing rods in a similarly short amount of time. The device should help protect the fishing rods and reels against damage and not itself damage the rods. The present invention is well adapted to accomplish these and other purposes.

Definitions

As used herein, the words "comprise," "has," and "include" and all grammatical variations thereof are each intended to have an open, non-limiting meaning that does not exclude additional elements or parts of an assembly, subassembly, or structural element.

As used herein, "generally" means of or having such a characteristic, as in "bag-shaped" or at least recognizably or approximately having such a characteristic shape, even if not exactly of or having the characteristic.

As used herein, terms such as "first," "second," "third," etc. are arbitrarily assigned and are merely intended to differentiate between two or more parts that are similar or corresponding in structure and/or function. It is to be understood that the words "first" and "second" serve no other purpose and are not part of the name or description of the following terms. Furthermore, it is to be understood that the mere use of the term "first" does not require that there be any "second" similar or corresponding part, either as part of the same element or as part of another element. Similarly, the mere use of the word "second" does not require that there by any "third" similar or corresponding part, either as part of the same element or as part of another element, etc.

As used herein, the words "upper," "lower," and "bottom," are with respect to the direction of insertion of a fishing rod into a device according to the invention, wherein, as will hereinafter be described in detail, the rear portion of a fishing rod is inserted into an opening in the upper end of the device and through the interior of the device toward a lower end and bottom of the device.

It should also be understood, for example, that the function of a single structure described herein can sometimes be performed by more than one part unless the context requires otherwise, or the functions of two different structures can be performed by a single or integrally formed part. Especially from manufacturing and cost perspectives, it is preferred to design so as to minimize the number of parts. These costs include not only the costs associated with making the parts, but also the costs of assembly. Preferably, the fewest possible number of parts and steps required to manufacture and assemble the apparatus, the better.

If there is any conflict in the usages of a word or term in this specification and one or more patent or other documents that may be incorporated herein by reference, the definitions that are consistent with this specification should be adopted for the purposes of understanding this invention.

Fishing Rod Definitions

It is to be understood, of course, that the purpose of this invention is for the temporary storage and protection against crime-of-opportunity theft of one or more fishing rods.

As used herein, the term "fishing rod" means and includes an attached reel, unless the presence of the reel for the rod is separately specified.

The size and shape of the device according to the invention is appropriately defined in relation to a fishing rod and, more particularly, certain parts of a fishing rod. For this purpose, it should be understood, for example, the length of typical fishing rods range from about 5 feet (1.5 meters) to about 12 feet (3.7 meters) long, depending on the type. It should be further understood that the diameter of a typical reel is in the range of about 2 inches (5 cm) to about 6 inches (15 cm). Typically, a reel is mounted onto the rod blank and stands off from the rod a sufficient distance to allow for operation of the reel, typically in the range of about 0 inches (0 cm) to about 4 inches (10 cm) from the rod blank. Of course, a few fishing rods are outside these ranges, but for reference purposes, these are typical.

A "rod blank" is the central shaft everything else on the fishing rod is built around. Blanks can be made of different materials, but most rods are now constructed of graphite. The rod blank is typically tapered, and the top of the blank is called the "tip," while the heavy section is known as the "butt."

To facilitate transportation, longer rods, such as those for most fly rods, are manufactured in sections. The sections have special joints, called "ferrules," that slip together snugly.

At the butt of the rod blank is the "reel seat." The foot of a reel is slipped into the reel seat, and locking rings are screwed down to hold the foot firmly in place. Modern reel seats are generally either metal or graphite.

Next to the reel seat is the "rod handle," which typically extends between the reel seat and the rearward end of the butt. Handles come in a number of different shapes and sizes. Most rods feature cork handles, but some less expensive rods utilize rubber ones.

"Rod guides" are attached to the blank, and the fishing line slides through them. Rod guides come in several different shapes.

As used herein, the "rear portion" of a fishing rod includes at least the reel seat, the reel, and the rod handle of the butt; whereas the "forward portion" of a fishing rod is any portion of a fishing rod from the tip toward the rear portion and that excludes at least the "rear portion."

As used herein, a largest cross-section of the rear portion of a fishing rod and reel is the largest cross-sectional area through the fishing rod and attached reel that is perpendicular to the length of the rod blank of the fishing rod.

The parts of a fishing rod and reel are extremely common and well known. No more particular description of such well-known items should be necessary for the purposes of describing this invention.

Other Definitions

As used herein, the term "cut-resistant" means resistant to cutting with a knife, such as a pocket knife that may be commonly carried. It should be understood, of course, that, as the purpose of the invention is to help protect against crime-of-opportunity theft it is not necessary to guard against cutting with wire-cutters or power tools. Examples of materials that would be considered cut-resistant include braided steel wire and flexible sheet material reinforced with braided steel wire. In contrast, examples of materials that would not be considered "cut-resistant" include flexible sheet material made entirely of natural fabric such as hemp canvas or plastic film such as polyethylene or polypropylene, and thin rope made entirely of natural hemp fibers.

As used herein, a "lock" means a security fastening, for example, a security fastening operated by a key or a combination. Similarly, "locking" means the act of securing and locking with such a security fastening. The lock should be sufficient to deter crime-of-opportunity theft, but is not required to be strongly resistant to cutting with heavy-duty tools such as bolt, chain, or wire cutters or resistant to cutting with electrically-powered cutting tools.

Device According to a Presently Most-Preferred Embodiment

Figures 1, 2:
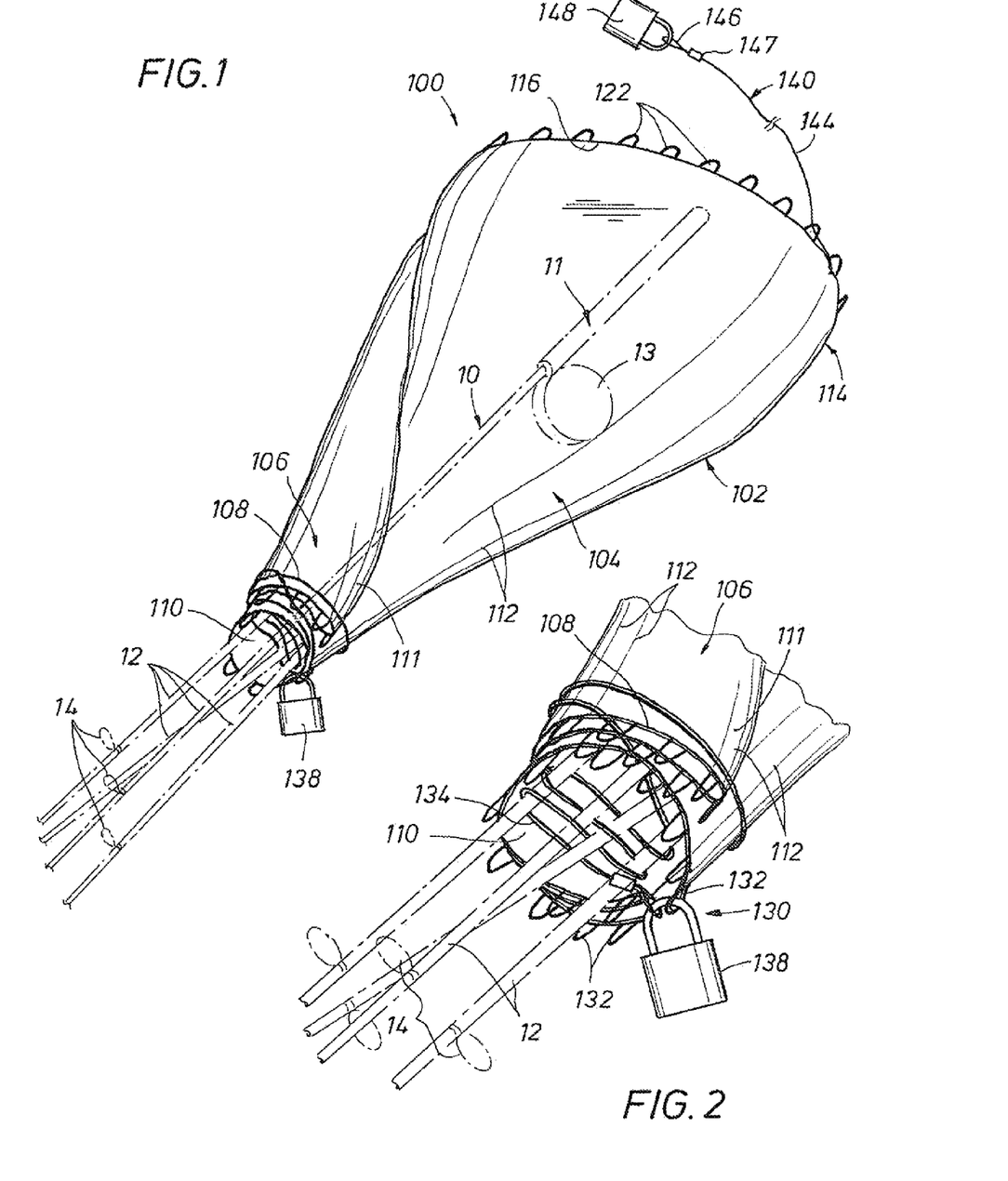
FIG. 1 is a perspective view toward the upper end of a presently most-preferred embodiment of the portable device for securing a plurality of fishing rods, which illustrates the device enclosing the rear portions of a plurality of fishing rods and having forward portions of the fishing rods protruding from the upper end of the device, and further illustrating a cable woven between and about the forward portions of the fishing rods and the upper end of the device to cinch down the opening around the forward ends of the plurality of fishing rods protruding from the upper end of the device and secure the fishing rods from crime-of-opportunity theft.
FIG. 2 is an enlarged view of the upper end of the device and a cable woven through and around a plurality of fishing rods extending through the opening of the device and cinching down the opening of the device around the plurality of fishing rods protruding through the opening.

FIG. 1 of the drawing is a perspective view of a presently most-preferred embodiment of a device according to the invention, where the device is generally designated in the figures by the reference numeral 100. The device 100 has a generally bag-shaped body 102, which includes a generally-tubular portion 104, which in FIG. 1 is shown in a wrapped and closed condition for securing a plurality of fishing rods 10. The perspective view of FIG. 1 is toward an upper end 106 of generally-tubular portion 104 of the generally bag-shaped body 102 of the device 100. FIG. 2 is a detail of the upper end 106 of the device 100.

An upper-end circumferential edge 108 of the upper end 106 defines an opening 110. As shown in FIGS. 1-2, the flexible material of the generally-tubular portion 104 at the upper end 106 can be folded and wrapped to have a wrapped portion 111. The wrapped portion is wrapped around to substantially reduce the size of the opening 110. Wrapping and gathering the upper end 106 forms a plurality of pleats 112 in the flexible material of the generally tubular portion 104.

Referring to FIG. 1, the generally-tubular portion 104 of the device 100 also has a lower end 114 and a lower circumferential edge 116, which can be attached to a bottom-wall portion 118 (not shown in FIG. 1) as hereinafter described in more detail.

The generally-tubular potion 104 of the device 100 is formed of a cut-resistant, flexible webbing material as will hereinafter be described in more detail.

Figures 3, 4:
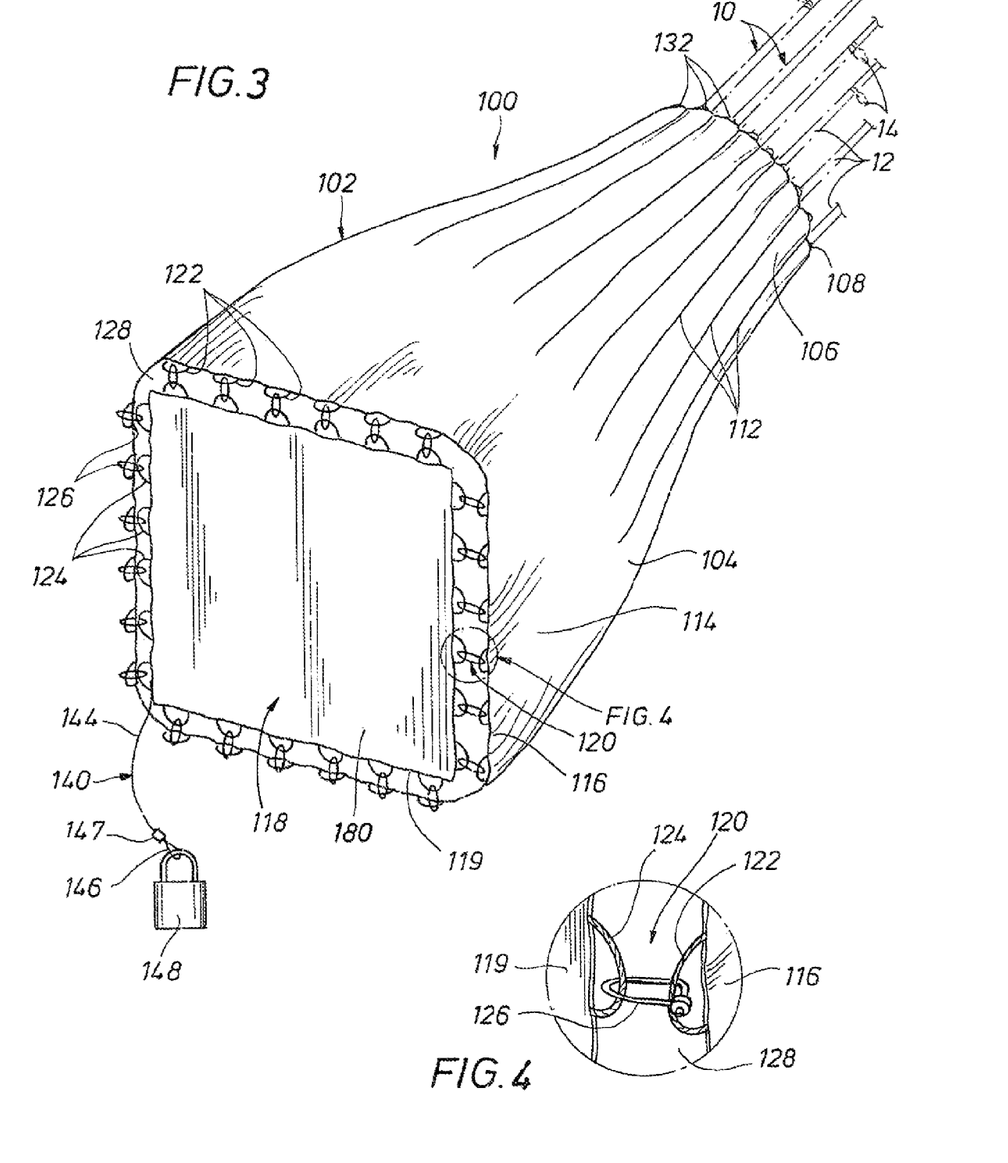
FIG. 3 is a perspective view toward the bottom end of the presently most-preferred embodiment of the device, wherein a first flexible webbing material forming a generally tubular portion and a second flexible webbing material forming a bottom-wall portion together form a generally bag-shaped body for the device, and wherein the forward portions of a plurality of fishing rods are illustrated protruding from the upper end of the device.
FIG. 4 is a detail view of a representative link for connecting a portion of the first flexible webbing material and a portion of the second flexible webbing material of the device to one another.

FIG. 3 is a perspective view toward the lower end 114 and a bottom-wall portion 118 of the presently most-preferred embodiment of the device 100. The bottom-wall portion 118 has a bottom-wall peripheral edge 119. The generally bag-shaped body 102 includes both the generally-tubular portion 104 and the bottom-wall portion 118, which together form the generally bag-shaped body 102 for the device 100.

As will hereinafter be described in more detail, the bottom-wall portion 118 is preferably formed of a cut-resistant material. More preferably, the bottom-wall portion 118 is formed of a cut-resistant, flexible webbing material.

Overall, the generally bag-shaped body 102 and the device 100 as a whole are preferably durable flexible, and relatively lightweight to be easily portable by hand. Preferably, the device weighs between about 2 and 7 pounds (0.9 and 3 Kg), and most preferably about 4-5 pounds (1.8-2.2 Kg).

Continuing to refer to FIG. 3, an interconnecting means 120 is provided for operably connecting the generally-tubular portion of 104 and the bottom-wall portion 118 of the generally bag-shaped body 102. According to a presently most-preferred embodiment of the invention, the interconnecting means 120 includes a plurality of lower-end loops 122 formed in or connected to a lower circumferential edge 116 of the lower end 114 of the generally-tubular portion 104. The interconnecting means 120 also includes a plurality of bottom-wall loops 124 formed in or connected to a bottom-wall peripheral edge 119 of the bottom-wall portion 118. Further, the interconnecting means includes a plurality of links 126, where, as best shown in the detail view of FIG. 4, each of the plurality of links 126 can be used to connect one of the plurality of lower-end loops 122 of the lower circumferential edge 116 of the generally-tubular portion 104 to one of the bottom-wall loops 124 of the bottom-wall peripheral edge 119 of the bottom-wall portion 118. Accordingly, the lower end 114 of the generally-tubular portion 104 can be interconnected to the bottom-wall portion 118. This provides a simple method of manufacturing the generally bag-shaped body 102. Further, this provides a peripheral gap 128 between the lower end 114 generally-tubular portion 104 and the bottom-wall portion 118. The peripheral gap 128 allows for any water to drain out of the generally bag-shaped body 102 and for air to circulate into and out of the generally bag-shaped body 102. The peripheral gap 128 can help keep the interior of the device 100 free of mold and mildew.

Referring again primarily to FIG. 1, the structure of preferred cut-resistant, flexible webbing material for making the generally-tubular portion 104 and the bottom-wall portion 118 of the bag-shaped body 102 are each hereinafter described in more detail. It should be understood, of course, that the generally bag-shaped body 102 can be manufactured to be formed of a flexible material that is connected together to form the generally bag-shaped body 102 without having any peripheral gap 128, however, that would not provide some of the advantages of having a relatively small opening for circulating air, such as the peripheral gap 128.

The generally bag-shaped body 102 of the device 100 is of a size and adapted for enclosing and securing a plurality of fishing rods, each fishing rod generally designated by the reference numeral 10. Each fishing rod 10 has a rear portion 11 (one of which is shown in outline in FIG. 1), including an attached reel 13, positioned inside the bag-shaped body 102 of the device 100. A forward portion 12 of each fishing rod 10 is illustrated protruding from the upper end 106 of the device 100, each rod having a plurality of guides 14.

It is not necessary for the device 100 to enclose the entire length of the fishing rods 10, provided that rear portion 11 having the reel 13 on each of the fishing rods can be protected. Preferably, the generally-tubular portion 104 of the bag-shaped body 102 has an internal diameter in the range of about 12-18 inches (30-46 cm) and an internal length in the range of 30-48 inches (76-120 cm). According to the presently most-preferred embodiment, the generally-tubular portion 104 of the bag-shaped body 102 has an internal diameter of about 15 inches (38 cm) and an internal length of about 36 inches (91 cm). As the generally-tubular portion 104 is made of a flexible material, the bottom-wall portion 118 can be of any convenient shape, but, according to the presently most-preferred embodiment, the bottom-wall portion 118 is preferably square.

Preferably, at least the interior surface of the generally-tubular potion 104 of the bag-shaped device is smooth, such as the surface of a plastic sheet, whereby the insertion and removal of the rear portion 11 of a fishing rod with an attached reel 13 is reasonably well protected and unlikely to catch or snag on any interior surface features. The interior surface is preferably relatively smooth so that it does not scratch or damage a fishing rod.

As shown in FIGS. 1-2 and as will hereinafter be described in more detail, a wrapped portion 111 of the upper end 106 of the device 100 can be wrapped and cinched down around the forward ends 12 of the plurality of fishing rods 10 protruding from the upper end 106 of the device 100. FIG. 1 shows the device 100 in a closed position for securing a plurality of fishing rods 10 having forward portion 12 of the fishing rods 10 protruding through the cinched down opening 110 in the upper end of the device. As best illustrated in FIG. 2, when the flexible material of the upper end 106 of the generally-tubular portion 104 is wrapped around and gathered together or cinched down, it reduces the full-size of the opening 110 to prevent removal of the rear portions 11 of the plurality of fishing rods 10 that can be easily placed therein when the opening 110 is fully opened, as will be hereinafter described in more detail. Further, as best shown in the detailed view of FIG. 2 and as will be hereinafter described in more detail, a first cable 134 of a closure means 130 is used to thread and weave between and around the forward portions 12 of the fishing rods 10 to help secure the rods inside the device 100.

As shown in FIGS. 1 and 2, a closure means 130 is provided for securing the opening 110 of the upper end 106 of the generally-tubular portion 104 of the body 102 at least partially around a forward portion 12 of a fishing rod 10 when at least the rear portion of the fishing rod is positioned inside the body 102. Thus, when in such a closed position, a largest cross-section of the rear portion of a fishing rod and reel cannot be removed through the upper end 106 of generally-tubular portion 104.

According to the presently most-preferred embodiment of the invention, the closure means 130 includes a plurality of upper-end loops 132 formed in or connected to the upper-end circumferential edge 108 of the upper end 106 of the generally tubular portion 104. The upper end loops 132 are preferably uniformly spaced around the upper-end circumferential edge 108 of the upper end 106. This provides for the ability to uniformly cinch the opening 110 toward a closed position around the forward portion or portions 12 of one or more fishing rods 10.

The upper-end loops 132 are preferably formed of cut-resistant cable, which can be made of braided stainless steel. Additionally, each of the plurality of upper-end loops 132 preferably has a plastic coating, such as a vinyl plastic coating. The plastic coating on the loops 132 helps prevent the cable forming the loops from damaging the forward portions 12 of fishing rods 10 protruding from the upper end 106 of the generally-tubular portion 104. The plastic coating also improves the weather and salt-water resistance of the metal wire used in the upper-end loops 132.

The closure means 130 also includes a cable, which is arbitrarily referred to as a first cable 134, that is or can be threaded through some or all of this plurality of upper-end loops 132. The first cable 134 is preferably a braided metal cable, which resists cutting with a hand-held knife. Additionally, the first cable 134 preferably has a plastic coating, such as a vinyl plastic coating. The plastic coating on the first cable helps prevent the cable from damaging the forward portions 12 of the fishing rods. The plastic coating also improves the weather and salt-water resistance of the metal wire used in the first cable 134.

Figure 5:
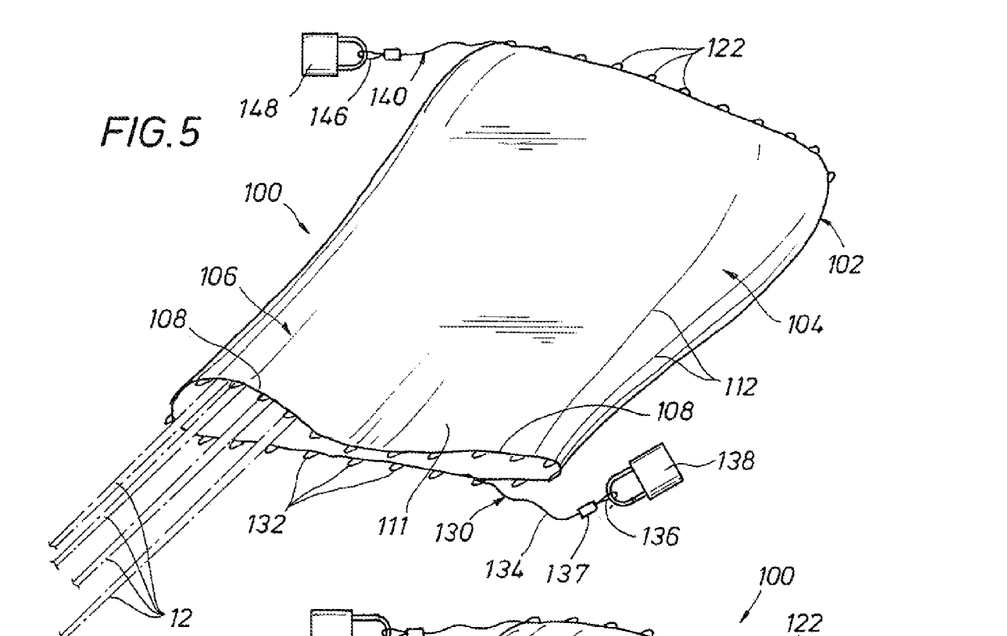
FIG. 5 is another perspective view toward the upper end of the embodiment of the device shown in FIG. 1, wherein the upper end of the bag-shaped body of the device is shown with the opening thereof in an open position in which it is easy to insert (or remove) the rear portions of one or more fishing rods, and in particular illustrates the position of a plurality of fishing rods having been inserted into the bag-like body of the device with forward portions thereof protruding from the opening of the bag-shaped body.

At least one end of the first cable 134 has a loop end 136. As shown in FIGS. 1 and 5, the loop end 136 can be formed by using a clamp 137, which can be pressed to rigidly hold two portions of the end of the first cable 134 adjacent to one another to form the loop end 136. The other end of the first cable 134 can be connected securely to the generally-tubular portion 104 of the body 102. As will be appreciated, it is also contemplated that the first cable 134 could have a loop end at each end of the first cable 134, which could be used to secure the two ends together in cinching the opening 110 into a closed position. The closure means 130 preferably further includes a lock, such as a padlock 138. For example, the padlock 138 can be operated with a key or a combination, or both, as desired or convenient.

As shown in FIGS. 1 and 2, the first cable 134 can threaded and woven through some of upper end loops 132 of the upper-end circumferential edge 108 to help gather and cinch the wrapped portion 111 of the opening 110 of the upper end 106 of the generally-tubular portion 104 around the forward portion 12 of a fishing rod 10 when at least the rear portion of the fishing rod 10 is positioned inside the bag-shaped body 102 as shown in FIG. 1. Some of the length of the cable 134 can be preferably threaded around and between the individual forward portions 12 of the fishing rods 10 and/or around the upper end 106 of the body 102, as can be convenient or desired. As the loops 132 and the cable 134 are preferably plastic coated, they should not damage the delicate material of the rod blank of a fishing rod. The cable 134 threaded and woven around and between the fishing rods 10 makes it impossible to quickly remove the fishing rods with attached reels from the device.

The padlock 138 can be used selectively to secure the first cable 134 in any convenient manner to itself, to any of the upper-end loops 132 to maintain the upper end 106 of the generally-tubular portion 104 securely around the protruding forward portion 12 of a fishing rod 10 or around the forward portions of a plurality of fishing rods, thereby preventing removal of a fishing rod 10.

As shown in FIGS. 1 and 3, an attachment means 140 is provided for securing the generally bag-shaped body 102 to a fixed structure in the open area or on the vehicle. Thus, when the attachment means 140 is secured to such a fixture, the body 102 cannot be picked up and stolen. According to the invention, it is preferable to have separate closure means 130 and attachment means 140. This allows the body 102 to be attached to a fixed structure independently of using the closure means 130 for closing and re-opening the body 102. A benefit is that the attachment means 140 can be positioned and locked without concern for the arrangement of the closure means 130 for securing and locking one or more fishing rods 10 in position partially inside the body 102 of the device 100. It is believed that having a separate closure means 130 and attachment means 140 would be faster and easier to use for securing and locking one or more fishing rods, especially when desired to do so repeatedly during a fishing trip.

According to the presently most-preferred embodiment of the invention, the attachment means 140 includes the plurality of lower-end loops 122 formed in or connected to the lower-end peripheral edge 116 of the lower end 114 of the generally-tubular portion 104. In other words, the lower-end loops 122 can serve two functions, one, as previously described, to interconnect the generally-tubular portion 104 and the bottom-wall portion 118 of the generally bag-shaped body 102; and two, as part of the attachment means 140. It should be understood, of course, that separate structures could be used for each of these purposes. Additionally, each of the lower-end loops 122 preferably has a plastic coating, such as a vinyl plastic coating. The plastic coating on the lower-end loops 122 helps prevent the cable of the loops from damaging the butts of the fishing rods 10. The plastic coating also improves the weather and salt-water resistance of the metal wire used in the lower-end loops 122.

The attachment means 140 also includes a cable, which is arbitrarily referred to as a second cable 144. The cable 144 is or can be threaded through some or all of this plurality of lower-end loops 122. The second cable 144 is preferably a braided metal cable, which resists cutting with a hand-held knife (which is preferably made of the same braided metal cable as the first cable 134). Additionally, the second cable 144 preferably has a plastic coating, such as a vinyl plastic coating. The plastic coating on the second cable 144 helps prevent the cable from damaging the forward portions 12 of the fishing rods. The plastic coating also improves the weather and salt-water resistance of the metal wire used in the second cable 144.

At least one end of the second cable 144 has a loop end 146. As shown in FIGS. 1 and 3, the loop end 146 of the second cable 144 can be formed by using a clamp 147, which can be pressed to rigidly hold two portions of the end of the second cable 144 adjacent to one another to form the loop end 146. The other end of the second cable 144 can be connected securely to the body 102 of the device 100. For example, the second cable 144 can be connected securely and permanently to either or both of the generally-tubular portion 104 or the bottom-wall portion 118. As will be appreciated, it is also contemplated that the second cable 144 could have a loop end at each end of the second cable 144, which could be used to secure the two ends together in securing the device 100 to a fixed structure. The attachment means 140 preferably further includes a lock, such as a padlock 148. For example, the padlock 148 can be operable with a key or a combination, or both, as desired or convenient. Most preferably, the key or combination is the same for both the padlock 138 of the closure means 130 and the padlock 148 of the attachment means 140, which is more convenient in use.

Figure 11:
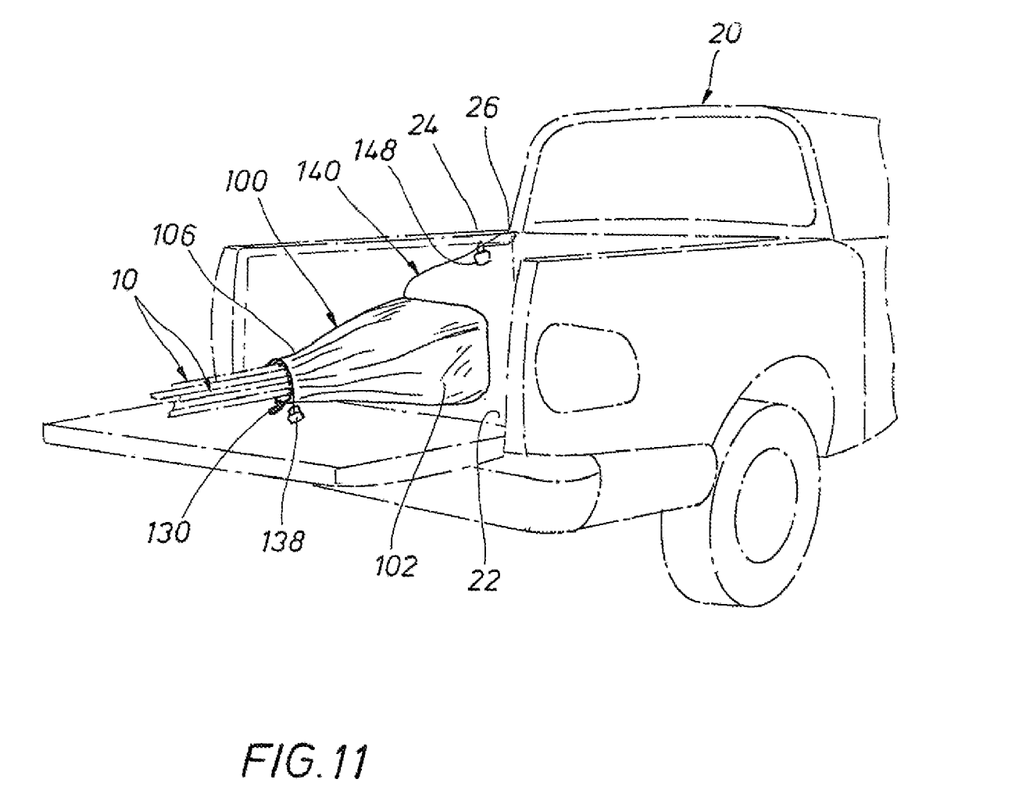
FIG. 11 illustrates the use of the device for securing a plurality of fishing rods in the back of an open-bed vehicle, such as a pick-up truck.

Referring briefly ahead to FIG. 11 of the drawing, the use of the device 100 is illustrated for securing a plurality of fishing rods against crime-of-opportunity theft. The device 100 is shown partially containing a plurality of fishing rods 10 positioned in the open bed 22 of an open-bed vehicle, such as a pick-up truck 20.

At least the rear portions 11 of the fishing rods 10 are secured in the generally bag-shaped body 102 of the device. At least a forward portion 12 of the fishing rods 10 protrudes through the opening of the device 100. The opening is shown fully wrapped and cinched down around the forward portions 12 of the fishing rods 10. As described above and with reference back to FIGS. 1 and 2, a first cable 134 of the closure means 130 is also used to help secure the rear portions of the fishing rods 10 in the device 100. The opening 110 and the first cable 134 are closed and threaded through the forward portions of the fishing rods and cinched down sufficiently around the forward ends 12 of the fishing rods 10 to be substantially smaller than a cross-section through the butt portion of a fishing rod having an attached reel. This prevents the rear portion of any fishing rod 10 positioned in the device 100 from being removed. The upper end 106 of the body 102 is closed and secured with the closure means 130, including the padlock 138.

Referring again to FIG. 11, the generally bag-shaped body 102 is attached securely to an available fixture, such as a tie-down attachment point 26 formed on one of the side-walls 24 of the open bed 22. It should be understood, of course, that the open-bed vehicle 20 is merely representative, and the device 100 can be similarly used, for example, in the open bed of a boat or trailer, or in an open area that is unsecured to public access.

Figure 6:
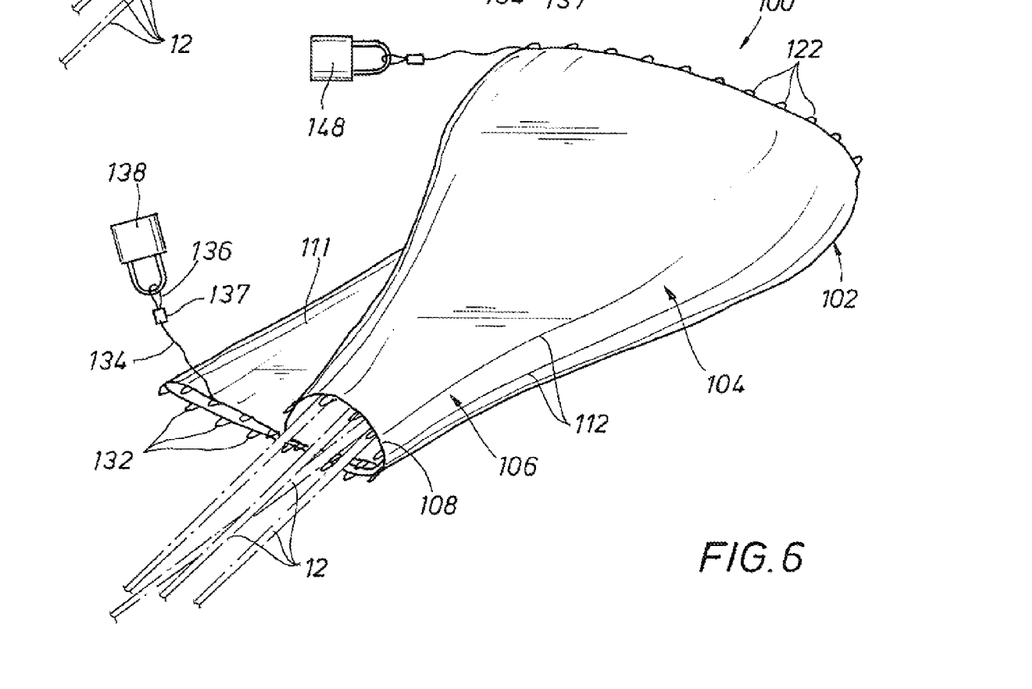
FIG. 6 is another perspective view toward the upper end of the embodiment of the device shown in FIGS. 1 and 5, wherein the upper end of the bag-shaped body of the device is shown with the opening thereof in the process of being closed (or opened) around the forward portions of a plurality of fishing rods protruding from the bag-shaped body of the device.

FIGS. 5 and 6, and then with reference to FIG. 1, illustrate the process of positioning one or more fishing rods 10 (or at least the rearward portions thereof) into the device 100 and closing the opening 110 of the device. When considered in a reverse sequence, FIG. 1, to FIG. 6, and then FIG. 5 illustrate the process of opening the device 100 to be able to remove one or more of the fishing rods 10 positioned therein from the device.

More particularly, FIG. 5 is another perspective view toward the upper end 106 of the embodiment of the device 100 shown in FIG. 1, wherein the upper end 106 of the bag-shaped body 102 of the device is shown with the opening 110 thereof in an open position. In such an open position, it is easy to insert (or remove) the rear portion 11 (not visible inside the device 100 in this Figure) of each of one or more fishing rods 10. FIG. 5 illustrates a representative position of the rearward portions of a plurality of fishing rods having been inserted into the bag-like body of the device with forward portions 12 thereof protruding from the opening of the generally bag-shaped body 102.

FIG. 6 is another perspective view toward the upper end 106 of the embodiment of the device shown in FIGS. 1 and 5, wherein the upper end of the generally bag-shaped body 102 of the device 100 is shown with the opening thereof in the process of being closed (or opened) around the forward portions 12 of a plurality of fishing rods protruding from the bag-shaped body of the device. More particularly, the wrapped portion 111 is available to be folded and wrapped around the forward portions 112 of one or more fishing rods protruding from the opening of the device 100, or in the process of opening the device, unwrapped from around the forward portions 12 protruding from the opening of the device.

Figure 7:
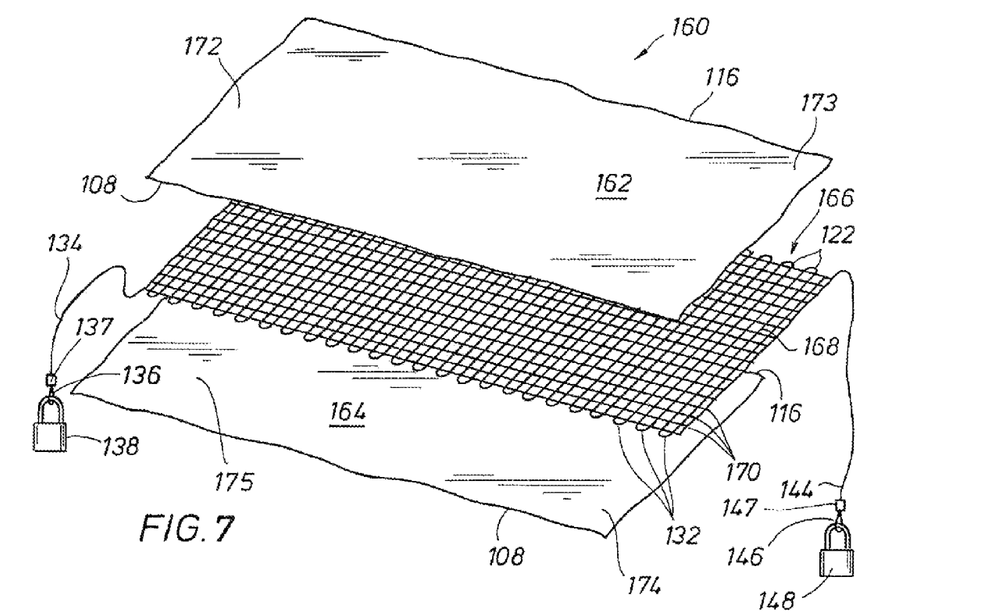
FIG. 7 illustrates a presently-preferred construction of the first flexible webbing material, which includes two sheets of a flexible plastic material sandwiching a plurality of reinforcing strands of cable laid out in a crisscrossing pattern and wherein some of the cable can be laid out in a snaking back-and-forth pattern to form lower-end loops and upper-end loops at either end of the material, which lower-end loops can be used for attaching a second flexible webbing material to form a bottom of a bag-shaped device and the upper-end loops at the other end can be used for cinching the opening of the device around a forward portion of a fishing rod.
Figure 8:
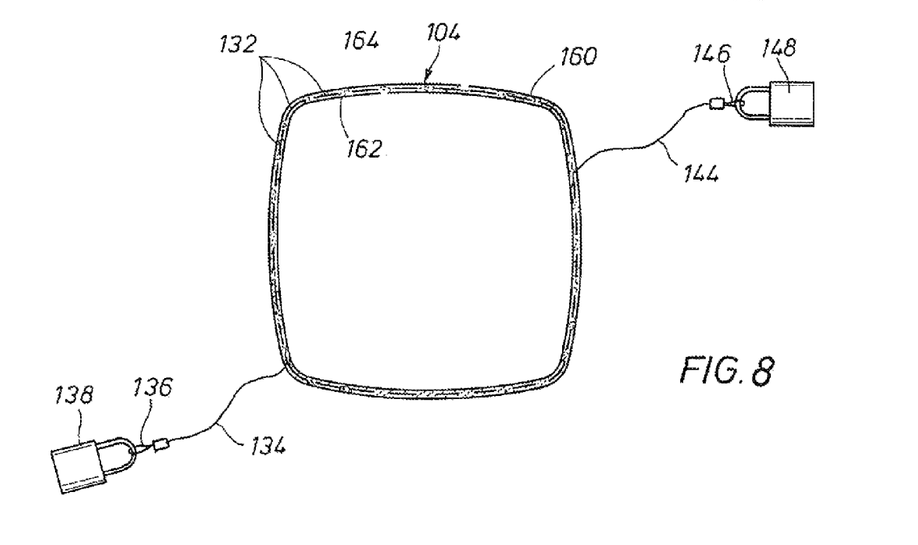
FIG. 8 illustrates a view toward the upper end of the presently-preferred construction of the first flexible webbing material.

FIGS. 7 and 8 illustrate a presently-preferred construction of a first flexible webbing material 160 for use in forming the generally-tubular portion 104 of the generally bag-shaped body 102 of the device 100 as shown in FIGS. 1 and 3. FIG. 7 illustrates the layered construction for making the first flexible webbing material 160, and FIG. 8 illustrates forming the layered construction into a generally-tubular portion 104.

Referring first to FIG. 7, the first flexible webbing material 160 preferably includes an inner sheet 162 of a flexible plastic material and an outer sheet 164 of a flexible plastic material sandwiching a plurality of reinforcing strands 166 of cable. Accordingly, the interior of the first webbing material presents a substantially smooth surface, whereby the rear portion of the butt end of at least one fishing rod can slide against the interior of the first webbing material forming the interior wall without catching thereon. Similarly, the exterior of the first webbing material 160 also presents a substantially smooth surface, which helps avoid scratching the body of a boat or other surfaces exterior of the device 100. Most preferably, the flexible webbing material 160 with the reinforcing strands 166 is co-extensive and held together as a single sheet of flexible webbing material, whereby the reinforcing material stays with at least an inner sheet 162 of plastic material. This keeps the flexible webbing material and the reinforcing material integrally together to avoid creating any gaps in the pattern of reinforcing strands 166 and to minimize handling difficulties that might arise from using separable layers of plastic material 162 and strands 166 that are not held together into an integrally formed sheet of flexible webbing material 160.

Preferably, the flexible plastic material is opaque to visible light, opaque to UV radiation, and resistant to UV degradation from sunlight. The opacity of the plastic material to visible light helps protect the value of a rod and reel inside the device 100 from being readily discerned from the outside, and the UV opacity and resistance gives a longer life for the device and also helps protect the rod and reel therein. According to the presently most-preferred embodiment, the plastic material is vinyl coated nylon. A nylon material provides strength, and a vinyl material provides weatherproofing. If desired, advertising or other information can be printed on the outside surface of the plastic material.

The reinforcing strands 166 are preferably a cut-resistant cable, such as a braided metal cable. According to the presently most-preferred embodiment, the cable is $\frac{1}{16}$ inch (2 mm) of braided stainless-steel wire with a vinyl plastic coating.

According to the presently most-preferred embodiment of the invention, the inner sheet 162 and the outer sheet 164 are the same size, each being about 48 inches (122 cm) long and about 36 inches (91 cm) wide.

The strands of cable 166 are preferably laid out in a criss-crossing pattern, which gives cut resistance in two directions. Preferably, some of the cable can be laid out as a first length 168 in a snaked back-and-forth pattern as shown, where the loop-back portions of the snaking pattern protrude or extend past each of the edges 116 and 108 of the sheets 162 and 164 (when the sheets are overlaid and glued together). The loop-back portions protruding from the edge 116 (of the overlaid sheets 162 and 164) can be used to form the lower-end loops 122 at the lower-end circumferential edge 116 (after being formed into a generally-tubular structure). The loop-pack portions protruding from the edge 108 can be used to form the upper-end loops 132 at the upper-end circumferential edge 108 (after being formed into a generally-tubular structure). As described above, the lower-end loops 122 formed by the protruding loop-back portions of the first length 168 snaking can be used for attaching a bottom-wall portion 118 of the bag-shaped body 102 for the device 100, and the upper-end loops 132 formed by the protruding loop-back portions of the first length 168 at the other edge of the first sheet 162 and second sheet 164 can be used for cinching the opening 110 of the device 100 around a forward portion 12 of a fishing rod.

According to the presently-most preferred embodiment, the ends of the first length 168 can be used for or connected to cables 134 and 144, respectively, as shown, which provides a means for securely connecting the cables to the generally-tubular portion 104. It is also contemplated that the cables 134 and 144 can be connected, for example, with swage connectors to the reinforcing material 168 or 170.

It should be understood that the loops 136 and 146, respectively, can be added or formed at any convenient stage of the manufacturing process. It should be further understood and the padlocks 138 and 148, respectively, can also be added at any convenient stage of the manufacturing process or to the packaging for the device or can be selected and added by a consumer after purchase of the device.

The strands of cable 166 also preferably include a plurality of straight strands 170, which are laid out perpendicular to the snaking pattern of the first length 168. The straight strands 170 are most preferably a length equal to or greater than the full circumference of the first webbing material to be formed into the generally-tubular portion 104.

The inner sheet 162 is preferably off-set several inches in a lengthwise orientation from the position of the outer sheet 164. The inner sheet 162 has end portions 172 and 173 at each end thereof. The outer sheet 164 has end portions 174 and 175 at each end thereof. Thus, the end portion 173 of the inner sheet 162 extends beyond the end portion 174 of the outer sheet 164, and the end portion 175 of the outer sheet 164 extends beyond the end portion 172 of the inner sheet 162. This allows the off-set extending portions 173 and 175 to be glued or otherwise attached together, thereby connecting the end portions 173 and 175 to form the first webbing material 160 into a generally-tubular portion 104 as shown in FIG. 8 for making a device 100. FIG. 8 illustrates a view toward the upper end of the presently-preferred construction of the first flexible webbing material 160 after it has been assembled and glued together into a generally-tubular portion 104.

Figure 9:
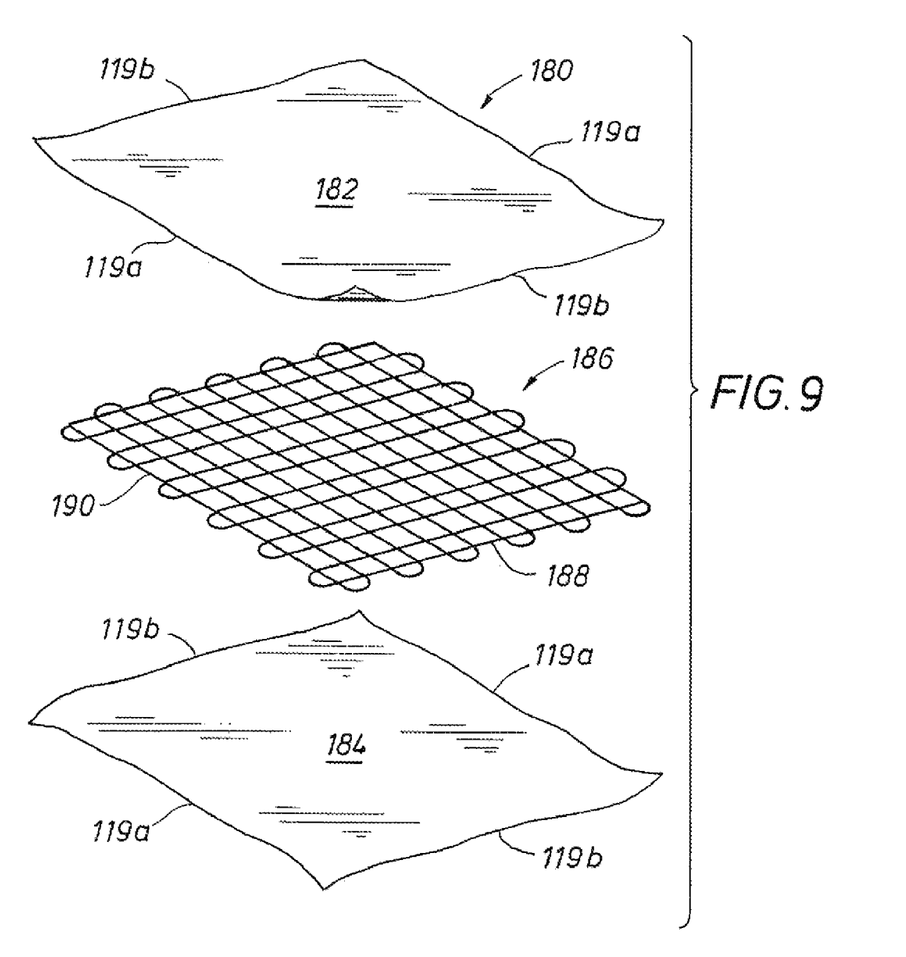
FIG. 9 illustrates a presently-preferred construction of the second flexible webbing material, which includes two sheets of a flexible plastic material sandwiching a plurality of reinforcing strands of cable laid out in a crisscrossing pattern, especially wherein two cables can be laid out in a snaking back-and-forth pattern perpendicular to each other to form bottom loops at all sides of the material, which bottom loops can be used for attaching the second flexible webbing material to the first flexible webbing material to form a bottom of a bag-shaped device.
Figure 10:
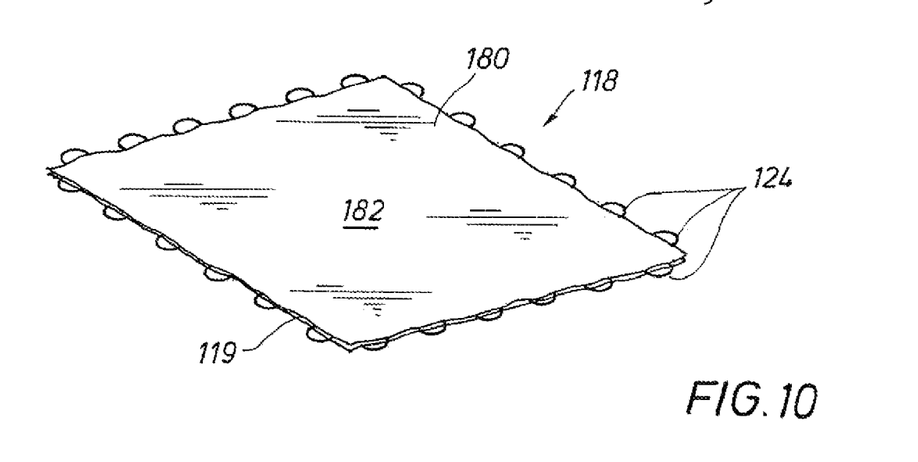
FIG. 10 illustrates a view of the second flexible webbing material after it has been constructed.

FIGS. 9 and 10 illustrate a presently-preferred construction of a second flexible webbing material 180 for use in forming the bottom-wall portion 118 of the generally bag-shaped body 102 of the device 100 as shown in FIG. 3. FIG. 9 illustrates the layered construction for making the second flexible webbing material 180, and FIG. 10 illustrates forming the layered construction into a bottom-wall portion 184.

Referring first to FIG. 9, the second flexible webbing material 180 preferably includes an inner sheet 182 of a flexible plastic material and an outer sheet 184 of a flexible plastic material sandwiching a plurality of reinforcing strands 186 of cable. Preferably, the flexible plastic material is opaque to visible light, opaque to UV radiation, and resistant to UV degradation from sunlight. The opacity of the plastic material to visible light helps protect the value of a rod and reel inside the device 100 from being readily discerned from the outside, and the UV opacity and resistance gives a longer life for the device and also helps protect the rod and reel therein. According to the presently most-preferred embodiment, the plastic material is vinyl coated nylon. If desired, advertising or other information can be printed on the outside surface of the plastic material. The reinforcing stands 186 are preferably a cut-resistant cable, such as a braided metal cable. According to the presently most-preferred embodiment, the cable is 1/16 inch (2 mm) of braided stainless-steel wire with a vinyl plastic coating.

According to the presently most-preferred embodiment of the invention, the inner sheet 182 and the outer sheet 184 are the same size, each being about 12 inches (30 cm) long and about 12 inches (30 cm) wide.

The strands of cable 186 are preferably laid out in a criss-crossing pattern, which gives cut resistance in two directions. Preferably, some of the cable can be laid out as a first length 188 in a snaked back-and-forth pattern, where the loop-back portions of the snaking pattern protrude or extend past each of the peripheral edge portions 119a of the sheets 182 and 184 (when the sheets are overlaid and glued together). The loop-back portions protruding from the edge portions 119a (of the overlaid sheets 182 and 184) can be used to form some of the plurality of the bottom-wall loops 124 at the peripheral edge 119 (after being formed into the bottom-wall portion 118). Similarly, some of the cable can be laid out as a second length 190 in a snaking back-and-forth pattern, where the loop-back portions of the snaking pattern protrude or extend past each of the peripheral edge portions 119b of the sheets 182 and 184 (when the sheets are overlaid and glued together). The loop-back portions protruding from the edge portions 119b (of the overlaid sheets 182 and 184) can be used to form some of the plurality of the bottom-wall loops 124 at the peripheral edge 119 (after being formed into the bottom-wall portion 118). The strands of cable 186 and 188 are preferably laid out in perpendicular snaking patterns.

In the presently most-preferred embodiment, the inner sheet 182 is preferably in aligned overlapping position with of the outer sheet 184. FIG. 10 illustrates a view of the presently most-preferred construction of the second flexible webbing material 180 after it has been assembled and glued together into a bottom-wall portion 118.

Preferably, each of the first and second webbing materials is resistant to rain or water spray from penetrating therethrough. Preferably, each of the first and second webbing material is resistant to ultraviolet sunlight degradation for at least one year under outdoor conditions. And preferably, the first webbing material is at least substantially opaque to visible light, whereby the particular nature of a fishing rod and reel positioned therein cannot be observed through the webbing material.

Both the first and second webbing material includes at least one plastic sheet material capable of being repeatedly folded in any direction without rupture. Preferably, the plastic sheet material is a polyvinyl material.

Most preferably, the plastic sheet material of the body 102 is reinforced with a metal, and more preferably with a metal wire. According to the presently most-preferred embodiments the sheet material for of the body 102 includes a stranded or a braided metal wire, which structure is more resistant to cutting than unbraided cable of the same overall dimensions. As described and shown, the metal wire is positioned to reinforce the plastic sheet material of the webbing material in a criss-crossing pattern to the generally-tubular shape. This resists cutting of the flexible webbing material for any length in any direction that would be sufficient to remove a fishing rod and reel from the body 102 of the device made with the flexible webbing material. For example, according to the presently most-preferred embodiment of the invention, the metal wire is crisscrossed at a spacing of about 2 inches (5 cm), although larger spacing is expected to be adequate. Preferably, the metal is rust-resistant steel.

The second flexible webbing material is different than the first flexible webbing material forming the generally-tubular shape.

The second flexible webbing material forming the bottom-wall portion prevents a largest cross-section of the rear portion of a fishing rod and reel from passing therethrough.

The presently most-preferred design for the device offers many advantages. The webbing material is flexible yet reinforced to be resistant to cutting with a hand-held knife. The interconnection between the first and second flexible webbing materials provides a peripheral gap for allowing water to drain out of the bag-like shape and air to circulate into and out of the bag-like shape. Allowing the device and the fishing rod or rods therein to dry out reduces the possibility for mold or mildew on either the inside of the device or on a fishing rod positioned therein. Nevertheless, the flexible webbing material also assists in keeping incidental water spray or rain from getting onto the parts of a fishing rod that may be susceptible to corrosion, especially from salt water spray.

It should be understood that, while it is believed that the presently most-preferred design offers many advantages, various sections or pieces of flexible webbing material could be sewn together or otherwise connected to form a generally bag-like shape as shown in FIGS. 1, 3, 5, and 11.

Method of Using the Security Device

Referring now primarily to FIGS. 5, 6, 1, and 11 in that order, a method is provided for securing against crime-of-opportunity theft of a fishing rod 10 (including an attached reel) to be stored or transported in an outdoor, unsecured area or on an open, unsecured portion 22 of a vehicle 20 (for example, as illustrated in FIG. 11). The method includes the steps of: (a) inserting at least a rear portion of at least one fishing rod 10 into and through an opening 110 of a body 102 of a device 100 having a generally bag-like shape and formed of a flexible webbing material (for example, as illustrated in FIG. 5); (b) closing and locking the opening 110 of the flexible webbing material around a forward portion of the fishing rod when at least the rear portion thereof is positioned inside the body formed of the flexible webbing material and locking the closure for the opening to prevent removal of the rear portion of the fishing rod from inside the device (for example, as illustrated in the steps of FIGS. 6 and 1); and (c) attaching and locking the body of the device 100 to any available fixed structure in the open area or on the vehicle and locking the attachment to the fixed structure (for example, as illustrated in FIG. 11). Each of the flexible webbing material of the generally bag-shaped body 102, the closure means 130 for the opening, and the attachment means 140 to the fixed structure is resistant to cutting with a hand-held knife.

It should be appreciated that the steps of the method can be performed in any practical order. For example, the step of attaching and locking the body of the device 100 to an available fixed structure in the open area or on the bed of the vehicle can be performed first and in practice often would be. After a desired temporary use, the device can be unlocked from the fixed structure until desired to be used again.

It should also be apparent that, with the opening 110 of the device closed and cinched down around the forward portion of a fishing rod 10, removal of the fishing rod is not possible because of the overall cross-section presented by a reel of the fishing rod 10.

It can be appreciated that, to properly remove a fishing rod 10 from the device 100, all that is required is to unlock the closure for the opening of the flexible webbing material, widen the opening, and pull out the rear portion of the fishing rod from inside the body of the device. The device 100 can remain attached and locked to a suitable fixture while the fishing rod is being used, and remains conveniently ready to be used. The device itself is secured against crime-of-opportunity theft by the attachment means 140.

According to a preferred embodiment of the method, the step of closing and locking the opening further includes the step of wrapping a portion of the flexible webbing material of the body of the device around a forward portion of at least one fishing rod and real protruding through the opening.

According to another preferred embodiment of the method, the step of closing and locking the opening further includes the step of: threading a first cable 134 through a plurality of loops 132 formed on a circumferential edge 108 of the opening 110.

According to another preferred embodiment of the method, the step of inserting further includes the step of inserting the rear portions of a plurality of fishing rods into and through an opening; and the step of closing and locking the opening further includes the step of threading a first cable 134 around and between at least two of the forward portions 12 of the plurality of fishing rods 10. More preferably, the step of closing and locking the opening further includes the step of threading a cable between the plurality of forward portions 12 of the fishing rods protruding through the opening and through a plurality of loops 132 formed on a circumferential edge 108 of the opening 110 of the device 100. And more preferably, the method of the step of closing and locking the opening further includes the step of connecting and locking the first cable 134 to the circumferential edge 108 of the opening 110.

Between uses, the device 100 can be stored in any convenient location, such as a closet in a home or the trunk of a vehicle.

The invention is described with respect to presently preferred embodiments, but is not intended to be limited to the described embodiments. As will be readily apparent to those of ordinary skill in the art, numerous modifications and combinations of the various aspects of the invention and the various features of the preferred embodiment can be made without departing from the scope and spirit of the invention. The invention is to be defined by the appended claims.

What is claimed is:

1. A device for securing against crime-of-opportunity theft of at least one fishing rod and reel to be stored or transported in an outdoor, unsecured area or on an open, unsecured portion of a vehicle, the device comprising:

(a) a first flexible webbing material,
  (i) wherein the first flexible webbing material, when opened, has a generally-tubular shape with an open upper end, the generally-tubular shape having a lower end opposing the open upper end, and a lower circumferential edge of the lower end including lower-end loops extending therefrom, and wherein the generally-tubular shape of the first flexible webbing material, when opened, has at least a sufficient internal cross-section and at least a sufficient internal length to receive at least a rear portion of at least one fishing rod and reel, wherein the rear portion comprises a handle, a reel seat, and an attached reel;
  (ii) wherein the first flexible webbing material is capable of retaining at least the rear portion of at least one fishing rod and reel positioned therein from being removed in any direction substantially perpendicular to the internal length of the generally-tubular shape of the first flexible webbing material; and
  (iii) wherein an upper end portion of the first flexible webbing material adjacent the open upper end can be folded and wrapped around a forward portion of a fishing rod;
  whereby the rear portion of at least one fishing rod and reel can be inserted or removed through the open upper end of the first flexible webbing material in a direction generally parallel to the internal length of the first flexible webbing material;

(b) a second flexible webbing material,
  (i) wherein the second flexible webbing material forming a bottom-wall portion closing the lower end of the first flexible webbing material that is opposite to the open upper end, and an outer peripheral edge of the bottom wall portion including bottom-wall loops extending therefrom;

(c) interconnecting means,
  (i) wherein the interconnecting means extending through the lower-end loops and the bottom-wall loops so as to connect the generally tubular shape and the bottom-wall portion, and a peripheral gap being defined between the lower circumferential edge and the outer peripheral edge which allows water to drain out of the device and for air to circulate into and out of the device;

(d) a closure means for securing and locking the open upper end of the first flexible webbing material at least partially folded and wrapped around a forward portion of a fishing rod protruding through the open upper end when at least the rear portion thereof is positioned inside the first flexible webbing material, so that, when in such a substantially closed position, a largest cross-section of the rear portion of a fishing rod and reel cannot be removed through the open upper end of the first flexible webbing material, wherein the closure means comprises:
  (i) a first cable connected to the first flexible webbing material having a first loop end adjacent a first end of the first cable;
  (ii) a plurality of upper end loops in the first flexible webbing material adjacent to and spaced around the open upper end of the first flexible webbing material; and
  (iii) a lock;
  so that by threading the first cable through the plurality of upper-end loops, the open upper end of the first flexible webbing material can be cinched to a substantially closed position and the lock can lock the open upper end of the first flexible webbing material in the substantially closed position; and (e) an attaching means for securing and locking the first flexible webbing material to a fixed structure in the open area or on the vehicle;

wherein each of the first flexible webbing material, the closure means, and the attaching means is resistant to cutting with a hand-held knife.

2. The device according to claim 1, wherein an interior of the first flexible webbing material presents a substantially smooth surface, whereby the rear portion of at least one fishing rod can slide against the interior of the first webbing material forming an interior wall without catching thereon.

3. The device according to claim 1, wherein the first flexible webbing material comprises a sheet of flexible plastic material that resists rain or water spray from penetrating therethrough.

4. The device according to claim 1 wherein the first flexible webbing material forming the generally-tubular shape is resistant to ultraviolet sunlight degradation for at least one year under outdoor conditions.

5. The device according to claim 1, wherein the first flexible webbing material is at least substantially opaque to visible light, whereby the particular nature of a fishing rod and reel positioned therein cannot be observed through the webbing material.

6. The device according to claim 1, wherein the second flexible webbing material is similar in material and structure to the first flexible webbing material forming the generally tubular shape.

7. The device according to claim 1, wherein the second flexible webbing material forming the bottom-wall portion prevents a largest cross-section of the rear portion of a fishing rod and reel from passing therethrough.

8. The device according to claim 1, wherein the attaching means comprises:
(a) a second cable connected to the first flexible webbing material having a second loop end adjacent a first end of the second cable; and
(b) a lock;
so that by threading the loop end of the second cable through at least one of the lower end loops, and by threading the loop end through or around any suitable fixture of the open area or vehicle, the device can be secured to the fixture.

9. The device according to claim 1, wherein the first cable has at least a sufficient length to be threaded and woven between and around the forward portions of a plurality of fishing rods to help secure the rods inside the device.

10. A device for securing against crime-of-opportunity theft of at least one fishing rod and reel to be stored in an outdoor, unsecured area or an open, unsecured portion of a vehicle, the device comprising:

(a) a flexible webbing material, wherein the flexible webbing material has a generally bag-like shape with an open upper end, and wherein an upper end portion of the flexible webbing material adjacent the open end can be folded and wrapped around a forward portion of a fishing rod, wherein the flexible webbing material further comprises:
(i) a first flexible webbing material, wherein the first flexible webbing material, when opened, has a generally-tubular shape with the open upper end, the generally-tubular shape having a lower end opposing the open upper end, and a lower circumferential edge of the lower end including lower-end loops extending therefrom;
(ii) a second flexible webbing material forming a bottom-wall portion closing the lower end of the first flexible webbing material that is opposite to the open end, an outer peripheral edge of the bottom wall portion including bottom-wall loops extending therefrom; and
(iii) interconnecting means extending through the lower-end loops and the bottom-wall loops so as to connect the generally tubular shape and the bottom-wall portion, and a peripheral gap being defined between the lower circumferential edge and the outer peripheral edge which allows water to drain out of the device and for air to circulate into and out of the device;
(b) a first cable and first lock operatively connected to the flexible webbing material for closing and locking the open end of the flexible webbing material folded and wrapped around a forward portion of a fishing rod when at least a rear portion thereof is positioned inside the flexible webbing material, and
(c) a second cable and second lock operatively connected to the flexible webbing material for attaching and locking the flexible webbing material to a fixed structure in the open area or on the vehicle;
wherein each of the flexible webbing material, the first cable for closing, and the second cable for attaching is resistant to cutting with a hand-held knife.

11. The device according to claim 10, wherein the first flexible webbing material comprises a plastic sheet material capable of being repeatedly folded in any direction without rupture.

12. The device according to claim 11, wherein the plastic sheet material comprises a vinyl coated nylon material.

13. The device according to claim 11, wherein the plastic sheet material is reinforced with a metal.

14. The device according to claim 13, wherein the plastic sheet material is reinforced with metal in the form of metal wire.

15. The device according to claim 14, wherein the metal wire comprises a stranded or a braided metal wire.

16. The device according to claim 15, wherein the metal wire has a plastic coating.

17. The device according to claim 16, wherein the plastic coating is a vinyl plastic coating.

18. The device according to claim 14, wherein the metal wire is positioned to reinforce the plastic sheet material of the first webbing material in a criss-crossing pattern to the generally-tubular shape.

19. The device according to claim 14, wherein the metal comprises a rust-resistant steel.

20. In combination, the device according to claim 10 and at least one fishing rod having at least a rear portion of at least one fishing rod and reel positioned inside the device.

21. A device for securing against crime-of-opportunity theft of at least one fishing rod and reel to be stored or transported in an outdoor, unsecured area or on an open, unsecured portion of a vehicle, the device comprising:

(a) a flexible webbing material, wherein the flexible webbing material, when opened, has a generally bag-like shape with an open end and has at least a sufficient internal cross section and at least a sufficient internal length to receive at least a rear portion of at least one fishing rod and reel, and wherein an upper end of the flexible webbing material adjacent the open end can be folded and wrapped around a forward portion of a fishing rod, wherein the flexible webbing material further comprises:

(i) a first flexible webbing material, wherein the first flexible webbing material, when opened, has a generally-tubular shape with the open end, and wherein the generally-tubular shape of the first flexible webbing material, when opened, has at least a sufficient internal cross-section and at least a sufficient internal length to receive at least a rear portion of at least one fishing rod and reel, wherein the rear portion of the butt end comprises at least a handle, a reel seat, and an attached reel, the generally-tubular shape having a lower end opposing the open end, and a lower circumferential edge of the lower end including lower-end loops extending therefrom;

(ii) a second flexible webbing material forming a bottom-wall portion closing the lower end of the first flexible webbing material that is opposite to the open end, and an outer peripheral edge of the bottom wall portion including bottom-wall loops extending therefrom; and (iii) interconnecting means extending through the lower-end loops and the bottom-wall loops so as to connect the generally tubular shape and the bottom-wall portion, and a peripheral gap being defined between the lower circumferential edge and the outer peripheral edge which allows water to drain out of the device and for air to circulate into and out of the device;

(b) a first cable and first lock operatively connected to the open end of the flexible webbing material for closing and locking the open end of the flexible webbing material folded and wrapped around a forward portion of a fishing rod when at least the rear portion thereof is positioned inside the flexible webbing material, wherein when in such a closed position, a largest-cross section of the rear portion of a fishing rod and reel cannot be removed through the open end of the flexible webbing material; and (c) a second cable and second lock operatively connected to the flexible webbing material for attaching and locking the flexible webbing material to a fixed structure in the open area or on the vehicle;

wherein each of the flexible webbing material, the first cable for closing, and the second cable for attaching is resistant to cutting with a hand-held knife.

\* \* \* \* \*